United States Patent [19]

Halvorson

[11] Patent Number: 4,951,778
[45] Date of Patent: Aug. 28, 1990

[54] SAFETY RESTRAINT FOR HUNTERS

[76] Inventor: Terry E. Halvorson, 2518 Mountain View Pl., Eau Claire, Wis. 54703

[21] Appl. No.: 400,092

[22] Filed: Aug. 29, 1989

[51] Int. Cl.5 .............................................. A62B 35/00
[52] U.S. Cl. ........................................... 182/9; 24/200
[58] Field of Search ...................................... 182/3-9; 24/200, 196, 194

[56] References Cited

U.S. PATENT DOCUMENTS

| | | | |
|---|---|---|---|
| 51,740 | 12/1865 | Monroe | 24/200 |
| 1,264,996 | 5/1918 | Tabler | 24/200 |
| 1,721,516 | 7/1929 | Jacobs | 182/9 |
| 1,971,571 | 8/1934 | McMullen | 182/9 |

OTHER PUBLICATIONS

Masterhunter Advertisement.
Buck-Buster Advertisement.

Primary Examiner—Reinaldo P. Machado
Attorney, Agent, or Firm—Merchant, Gould, Smith, Edell, Welter & Schmidt

[57] ABSTRACT

A safety restraint for hunters is disclosed. The safety restraint includes a user member for connection to the user, an anchor member for connection to a stationary object and means for connecting the user member and the anchor member such that the user may move freely and yet, is restrained by the stationary object.

16 Claims, 2 Drawing Sheets

SAFETY RESTRAINT FOR HUNTERS

FIELD OF THE INVENTION

This invention relates to safety restraint devices and, more particularly, to safety restraint devices used by hunters to prevent accidental falls when using a tree stand.

BACKGROUND OF THE PRIOR ART

Hunters who utilize tree stands or platforms above the ground to aid in hunting have long been hampered by the unavailability of an effective restraining device or safety belt that is readily available, easy to use, relatively inexpensive, safe and comfortable to the user. This need has been particularly acute for those using tree stands, where the nature of the stand hinders the hunters free movement during to apprehension of heights and possibility of accidentally falling from the stand. Because of these apprehensions, hunters may not feel free to take proper aim and, accordingly, may not be able to make the best shot at their quarry.

To minimize the possibility of accident, it has been common practice to utilize devices to ensure that the hunter stays with the stand. While a number of various devices have been used for such purposes, they have generally been unacceptable for a variety of reasons.

For example, it is advantageous for the device to be noiseless when used by a hunter waiting for game. Use of material or devices which create a considerable level of noise will hamper the efforts of the user to attract game. As will be appreciated by those skilled in the art, game, such as deer, are frightened by the slightest noise. Although it has long been known that use of safety restraint or belt devices by hunters is beneficial, it has generally been considered a hinderance or impractical to use a device which makes noise.

Further, many hunters have used devices to restrain themselves within a tree stand or other device and have found that it is difficult and sometimes impossible to quickly release the restraining device. This lack of a quick release presents a safety hazard. There are times when the user needs to quickly release himself or herself from the device which is hindered if the user is unable to find a release means, the release does not work as expected, or if the device does not include a quick release means.

In addition, many safety belt devices do not allow the freedom of movement to a user necessary to comfortably turn and move while restrained by the devices. The present invention allows the user to turn freely and without noise.

The present invention offers an improved safety restraint device that fills a need in the art for a simple, effective, inexpensive, easy to use device which is not hampered by noise or lack of flexibility of movement. The present invention allows the user to safely lean away from the tree at any angle in order to insure safe and accurate shots.

SUMMARY OF THE INVENTION

The present invention comprises a safety restraint for hunters, of the type particularly suitable for restraining the hunter to a tree in a deer stand. The device includes a user member for connecting to the user, an anchor member for attachment to a tree or other suitable generally vertical stand mounting member and a connecting member which cooperatively connects the user and anchor members. The user and anchor members include a strap and buckle wherein the buckle includes a release strap. The connector member includes a connector strap having two links, the links being located at opposite ends of the connector strap, where the user member is operatively connected to the first link and the anchor member is cooperatively connected to the second link. The user member is preferably placed around the waist of the user and adjusted by means of the buckle. The anchor member is connected to a tree or other suitable object in the same manner. Therefore, the hunter is connected to the tree by means of the connector member but is free to move about without apprehension of heights or inadvertent falls.

While the present invention will be described with respect to a preferred configuration of the device, and with respect to preferred materials and shapes of construction, it will be understood that other configurations, materials, and shapes could be used for constructing the safety devices, without departing from the spirit and scope of the invention. Various advantages and features of novelty which characterize the invention are pointed out with particularity in the claims annexed hereto and which form a part hereof. However, for a better understanding of the invention and its advantages obtained by its use, reference should be made to the drawings which form a further part hereof and the accompanying descriptive matter in which there is illustrated and described a preferred embodiment of the invention.

BRIEF DESCRIPTION OF THE DRAWINGS

Referring to the drawings, wherein like numerals represent like parts throughout the several views.

DETAILED DESCRIPTION OF THE INVENTION

Referring to the figures, there is generally illustrated at 10 a safety restraint device of a configuration and shape particularly suitable for use by hunters in tree stands, wherein the device is used to secure the user to the tree so that the user may move about freely without fear or possibility of falling from the stand. A typical stand which is utilized when a safety restraining device 10 is desired is a Deer Thief ® Timb-R-Lock Tree Stand manufactured by Amacker. Those skilled in the art will recognize that tree stands are typically utilized approximately 15 to 30 feet above the ground thereby inducing anxiety of falling or inadvertent falls. As those skilled in the art will recognize, tree stands are well known in the art and therefore, will not be described further herein.

Figure 1:
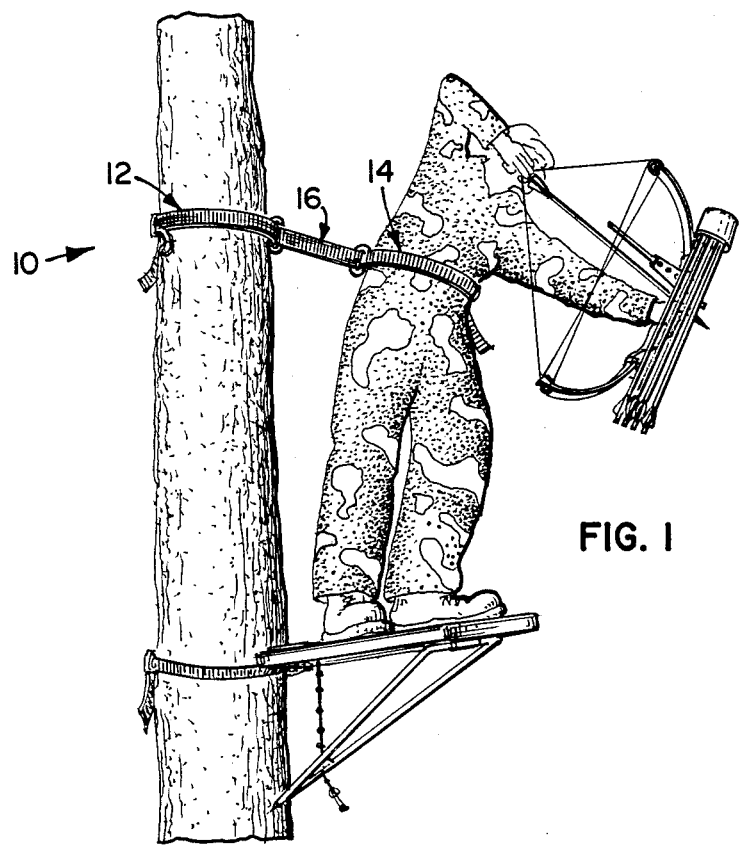
FIG. 1 is a diagrammatic view of an example of the usage of the safety restraint device constructed according to the principles of this invention.
Figure 2:
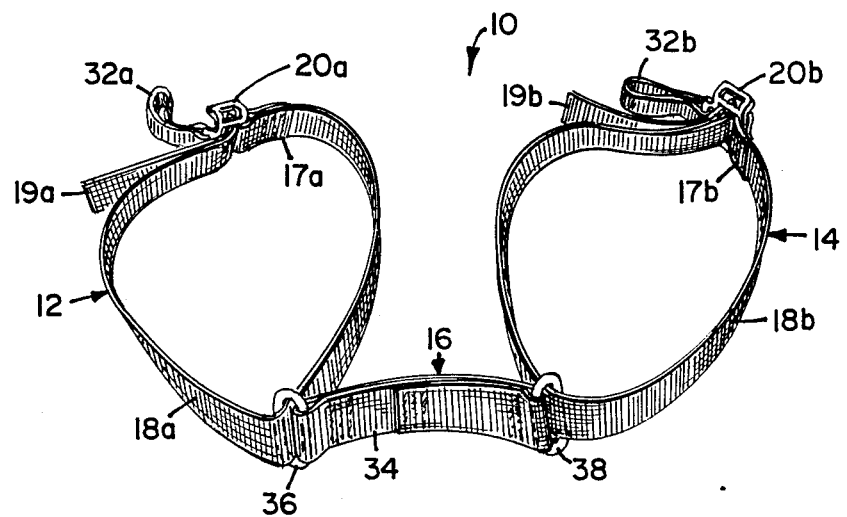
FIG. 2 is a perspective view of the device disclosed in FIG. 1.

As shown in FIGS. 1 and 2 in the preferred embodiment, the restraint device 10 includes a pair of members 12 and 14 connected by connector member 16. The members 12 and 14 are identical in the preferred embodiment and include a strap 18 having first and second ends 17 and 19 and buckle 20. Since members 12 and 14 are identical, only one description will suffice which applies to the other member.

Figure 4:
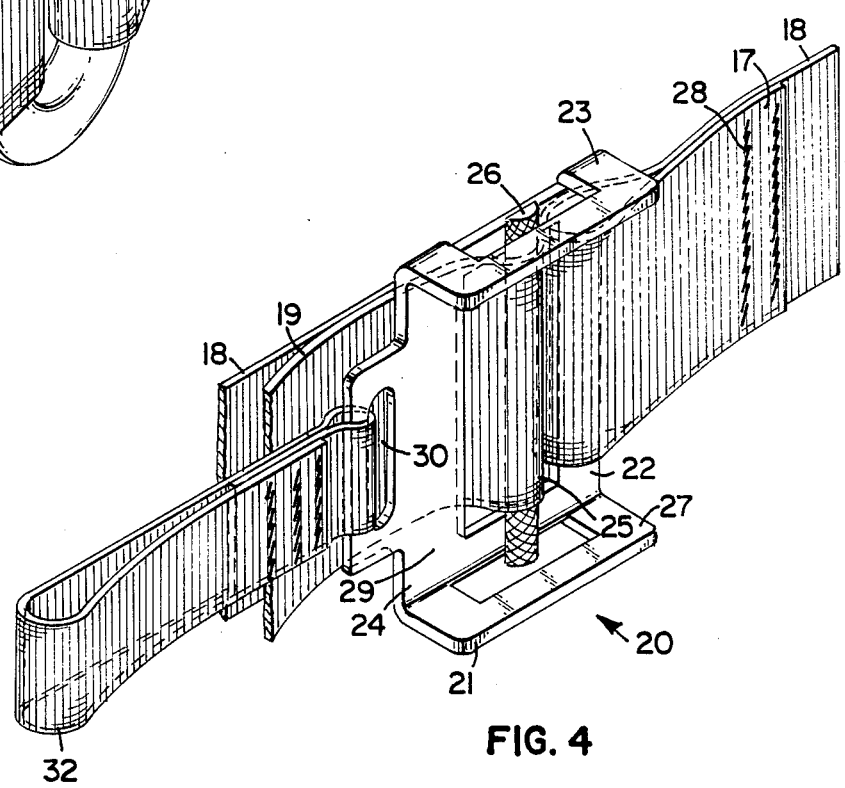
FIG. 4 is a partial perspective view of the device of FIG. 1 illustrating the buckle means.

Referring now to FIG. 4, buckle 20 includes a frame 21 having two sides 23 and 27 at a connecting portion 29. The connecting portion 29 includes a first end 22, a second end 24, and an aperture 25 formed therein. A stationary bar 26 is positioned and cooperatively connected to frame 21 between first and second ends 22 and 24 of buckle 20 by insertion into channels formed in sides 23 and 27. In the preferred embodiment, the bar 26 is generally semi-circular in cross-section and is mounted with the flat side resting on the connecting portion 29 of frame 21. The bar 26 is textured with a diamond knurl pattern as shown in FIG. 4. The diamond knurl has been found to aid in insuring a firm securing of the device 10 about the user and anchor, as will be discussed more fully hereinafter.

Buckle 20 is cooperatively connected to strap 18 at first end 22 as illustrated in FIGS. 2 and 4. In the preferred embodiment, strap 18 engages the first end 22 of the buckle 20 and is sewn as shown at 28. More specifically, first end 17 of strap 18 is inserted through aperture 25 and around the frame 21 at first end 22.

Figure 3:
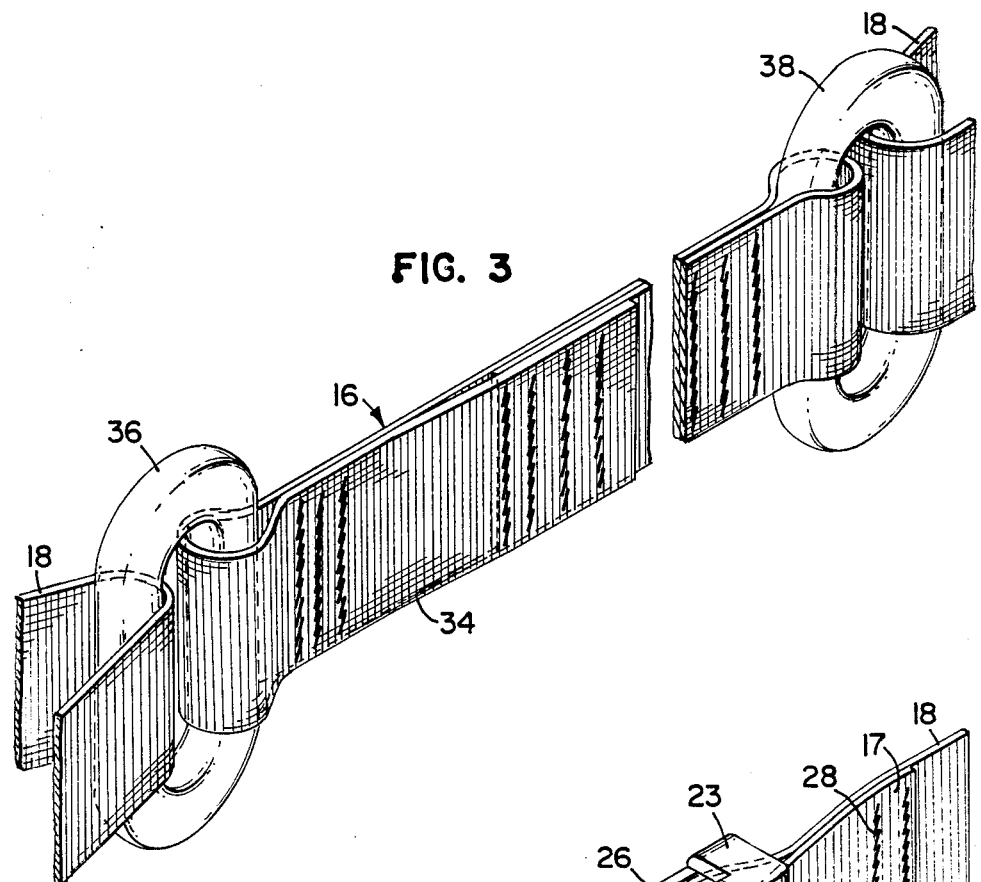
FIG. 3 is a partial perspective view of the device disclosed in FIG. 1 illustrating the connector member.

To form a belt like loop to be placed around the waist of a user or around a tree trunk, the second end 19 of the strap 18 is looped around bar 26 of the buckle 20 as shown in FIG. 3. More specifically, end 19 is threaded through aperture 25 between bar 26 and first end 22, over bar 26, and back through aperture 25 between bar 26 and second end 24. The buckle 20 and strap 18 allow the user to adjust the strap to secure it to the tree trunk or the user ensuring a good fit to both. The buckle 20 controls the circumference of the belt-like loops formed by members 12 and 14.

The strap 18 is made of polypropylene material in the preferred embodiment and stitched with nylon thread at the connection points, such as 28. In the preferred embodiment, strap 18 is 60 inches in length and 2 inches wide. It should be understood that many configurations and sizes of the device can be envisioned within the spirit and scope of the invention.

Still referring to FIG. 4, the second end 24 of buckle 20 includes an aperture 30. A release strap 32 is cooperatively connected to the buckle 20 through the aperture 30 of the second end 24. The release strap 32 is 12 inches in length, is made of polypropylene material in the preferred embodiment and is stitched with nylon thread. A description of the operation of release strap 32 will be deferred pending a discussion of the remaining elements of device 10. It should be understood that any other means of connection or release means within the spirit and broad scope of this invention may be utilized.

Referring next to FIG. 3, cooperatively connected to the straps 18 of each of the members 12 and 14 is connector member 16. The connector member 16 has a connector strap 34 and first and second links 36 and 38. The connector strap 34 slidably engages links 36 and 38 as illustrated in FIG. 3. The ends of strap 34 are inserted into the apertures of links 36 and 38. The ends of strap 34 are folded over so that they overlap and are sewn in the preferred embodiment. In the preferred embodiment, stitches are also taken in the strap 34 proximate each link 36 and 38 at 39 so that the links 36 and 38 are generally held at opposite ends of connector member 16 and prevent movement of the links 36 and 38 toward each other. Connector strap 34 is made of a polypropylene material in the preferred embodiment and is 22 inches long.

In the preferred embodiment, links 36 and 38 are of a solid metal material with a zinc coating to prevent rust. The links are available at Peerless Chain Co. of Winona, Minn. and are designated as size 9/0 side links. The links are welded and, in the preferred embodiment, are positioned so that the weld is engaged by connector member 16 rather than members 12 and 14 thereby insuring easy sliding without noise.

The connector member 16 is cooperatively connected to members 12 and 14 by links 36 and 38 as illustrated in FIG. 3. The second end 19 of strap 18 of each member 12 and 14, respectively, slidably engages links 36 and 38 operatively connecting members 12 and 14. The strap is looped through links 36 and 38 and sewn using nylon threading as illustrated in FIG. 3. It should be noted that any other means for connection of members 12 and 14 which can be envisioned in the spirit and scope of this invention may be used.

In operation, the device 10 is used in the manner generally shown in FIG. 1. The device 10 is utilized to anchor the user to a tree or other affixed object to allow movement of the user while preventing an accidental or otherwise inadvertent fall. To utilize device 10, typically, the user will remove the free end or second end 19a of strap 18a from buckle 20a in anchor member 12 and wrap the strap 18a around a tree. The second end 19a of strap 18a will then be fed into the buckle 20a through aperture 30a and around the diamond knurl bar 26a and tightened by pulling the free second end 19a of strap 18a back through aperture 30a around bar 26a. The diamond knurl configuration of bar 26a prevents slippage of the strap 18a through the buckle 20 thereby ensuring a secured restraint. Further, the strap 18a will not slip within buckle 20a thereby ensuring comfort and safety if a fall does occur.

The user will then loosen strap 18b from buckle 20b on user member 14 and wrap the strap 18b around his or her waist. The user will then tighten the strap 18b to a comfortable and secure position in the same manner as noted above. The user is now secured to the tree or other stationary object and through links 36 and 38 may move about the tree because of the friction free sliding action provided by the cooperative connection of the straps 18a and b and links 36 and 38. The present invention also allows the user to turn freely if desirable. The device allows the user to move freely, yet, the movement creates no noise due to the materials and friction free construction of the invention.

Because the user is secured to the tree or other object, he or she may lean forward or to the side and take aim at game which would not be possible without restraint. The device offers great advantages for bow and rifle hunters as well as observers and photographers who wish to prevent accidental fall. When the user wishes to release himself or herself from the safety restraint 10 the user may easily grasp release strap 32b and pull the release strap 32b toward the first end 22b of the buckle 20b. This release action allows the strap 18b to slide within the buckle 20b over bar 26b and "loosen" or increase the diameter of the belt-like loop of user member 14. The release strap 32 provides the advantage of a quick release for even numb and/or cold hands. The release strap 32 in the preferred embodiment is made of a different color than the strap 18b so that it may be discerned more easily by the user and engaged quickly if necessary. The release strap 32a of anchor member 12 is utilized in the same manner described above to release member 12 from the anchor or stationary object.

As noted above, the device 10 includes use of durable polypropylene material at a width of 2 inches in the preferred embodiment. This durable material having a thickness of approximately 2 millimeters, in the preferred embodiment, withstands many repeated and numerous uses without wear and folding of the strap 18 which would inhibit the friction free sliding of the strap within the links 36 and 38. Other materials providing a noiseless, friction free sliding might also be used as those skilled in the art will recognize.

It is believed that the invention, its mode of operation, construction, and assembly and many of its advantages should be readily understood from the foregoing without further description. While a particular embodiment of the invention has been described, other modification of the invention will be apparent to those skilled in the art in light of the foregoing description. This description is intended to provide a specific example of an embodiment which clearly discloses the present invention. Accordingly, the invention is not limited to the described embodiment or to the use of specific elements therein. All alternative modifications and variations of the present invention which fall within the spirit and broad scope of the appended claims are covered.

What is claimed is:

1. A safety restraint of the type wherein users are secured, comprising:
   (a) a user member for connection to the user;
   (b) an anchor member for connection to a stationary object; and
   (c) a connecting member having first and second ends, a first link proximate said first end and a second link proximate said second end wherein said first link slideably receives said user member and said second link slideably receives said anchor member;
   whereby the sliding engagement of said links and members allows the user to move about the stationary object and allows positioning of the user relative to said connecting member while being restrained by the stationary object.

2. The device of claim 1 wherein said user member includes a strap cooperatively connected to buckle means for adjusting said strap to fit the user.

3. The device of claim 1 wherein said anchor member includes a strap cooperatively connected to buckle means for adjusting said strap to fit the anchor.

4. The device of claim 2 wherein said buckle means includes a release strap for aiding in the release of said user member from the user, whereby activation of said release strap enables release of said strap from said buckle means.

5. The device of claim 3 wherein said buckle means includes a release strap for aiding in the release of said anchor member from the anchor, whereby activation of said release strap enables release of said strap from said buckle means.

6. The device of claim 2 wherein said strap is made of polypropylene material.

7. The device of claim 3 wherein said strap is made of polypropylene material.

8. The device of claim 2 wherein said buckle includes a frame cooperatively connected to a bar wherein said strap of said user member is looped through said frame and around said bar thereby fixing the strap.

9. The device of claim 4 wherein said connecting member is made of polypropylene material.

10. The device of claim 4 wherein said first and second links are made of metal.

11. The device of claim 10 wherein first and second links are coated with zinc.

12. A safety restraint of the type wherein users are secured, comprising:
   (a) a user member for connection to the user having a strap cooperatively connected to buckle means for adjusting said strap to fit the user wherein said buckle means includes a release strap for aiding in the release of said user member from the user, whereby activation of said release strap enables release of said strap from said buckle means;
   (b) an anchor member for connection to a stationary object having a strap cooperatively connected to buckle means for adjusting said strap to fit the anchor wherein said buckle means includes a release strap for aiding in the release of said anchor member from the anchor, whereby activation of said release strap enables release of said strap from said buckle means; and
   (c) means for connecting said user member and said anchor member, having a connecting member having first and second links wherein said first link is operatively connected to said user member and said second link is operatively connected to said anchor member to allow the user to move about the stationery object while being restrained by the stationery object.

13. The device of claim 12 wherein said connecting member is made of polypropylene material.

14. The device of claim 12 wherein said first and second links are made of metal.

15. The device of claim 12 wherein first and second links are coated with zinc.

16. A method for safely restraining and releasing a user, the method comprising:
   (a) connecting a user member to the user;
   (b) connecting an anchor member to a stationary object;
   (c) connecting said user member and anchor member, whereby the user is restrained by the stationary object; and
   (d) activating a release strap, whereby activation of the release strap enables release of the user from the anchor member.

* * * * *